(12) United States Patent
Maalouf et al.

(10) Patent No.: US 9,964,405 B2
(45) Date of Patent: May 8, 2018

(54) METHOD FOR ESTIMATING THE DISTANCE OF AN OBJECT FROM AN IMAGING SYSTEM

(71) Applicant: MORPHO, Issy les Moulineaux (FR)

(72) Inventors: Aldo Maalouf, Issy les Moulineaux (FR); Mokrane Malek, Issy les Moulineaux (FR); Sylvaine Picard, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 236 days.

(21) Appl. No.: 14/814,418

(22) Filed: Jul. 30, 2015

(65) Prior Publication Data

US 2016/0033269 A1    Feb. 4, 2016

(30) Foreign Application Priority Data

Aug. 1, 2014  (FR) .................... 14 57535

(51) Int. Cl.
*G06K 9/00* (2006.01)
*G01C 3/08* (2006.01)
*G01C 3/32* (2006.01)
*G02B 13/18* (2006.01)
*G06K 9/48* (2006.01)
*G06T 7/77* (2017.01)

(52) U.S. Cl.
CPC ............. *G01C 3/08* (2013.01); *G01C 3/32* (2013.01); *G02B 13/18* (2013.01); *G06K 9/481* (2013.01); *G06T 7/77* (2017.01); *G06T 2207/20076* (2013.01)

(58) Field of Classification Search
CPC . G01C 3/08; G01C 3/32; G02B 13/18; G06K 9/481; G06T 2207/20076; G06T 7/77
See application file for complete search history.

(56) References Cited

PUBLICATIONS

French Search Report and Written Opinion, dated Jun. 5, 2015, French Application No. 1457535.
Grosse, Max, et al., "Coded Aperture Projection", *ACM Transactions on Graphics*, vol. 29, No. 3, (Jun. 1, 2010), 1-12.
Levin, Anat, et al., "Image and Depth from a Conventional Camera with a Coded Aperture", *ACM Transactions on Graphics*, vol. 26, No. 3, (Jul. 1, 2007), 70-1.
Li, Yang, et al., "Simulation of Depth from Coded Aperture Cameras with Zemax", *Proceedings of the 10th International Conference on Virtual Reality Continuum and its Applications in Industry*, (Jan. 1, 2011), 463-466.
Trouve, Pauline, et al., "Passive depth estimation using chromatic aberration and a depth from defocus approach", *Applied Optics*, vol. 52, No. 29, (Oct. 10, 2013), 7152-7164.

*Primary Examiner* — Nirav G Patel
(74) *Attorney, Agent, or Firm* — Womble Bond Dickinson (US) LLP

(57) ABSTRACT

The invention relates to a method, for determining a distance between an object with respect to an imaging system, improving the reconstruction of images of objects imaged by an imaging system and improving the resolution of the images obtained.

10 Claims, 7 Drawing Sheets

METHOD FOR ESTIMATING THE DISTANCE OF AN OBJECT FROM AN IMAGING SYSTEM

FIELD OF THE INVENTION

The invention relates to a method for determining the distance of an object with respect to an imaging system.

The invention applies in particular to improving the reconstruction of images of objects imaged by an imaging system and to improving the resolution of the images obtained.

PRIOR ART

An imaging system conventionally comprises an image sensor, conventionally a digital sensor, a geometric aperture placed upstream of the sensor with respect to the light rays, and a unit for processing images that receives the signals generated by the sensor and reconstructs an image of an object from these signals.

In any digital imaging system, the image formed by the system is related to the object by the convolution product between the geometrical image formed, in the sense of geometrical optics, by the imaging system, and the impulse response of this system, that is to say the image of a punctual object by this system. This response is called the point spread function (PSF).

The processing unit must implement a deconvolution of the image acquired from the point spread function of the imaging system in order to improve the sharpness of the reconstructed image.

The quality of the deconvolution and the sharpness of the image obtained after processing therefore depend on the capacity of the system to determine the optimum point spread function of the system.

In order to facilitate the determining of the point spread function of the imaging system, it is known to modify the diaphragm of an imaging system by positioning a coded aperture upstream of the sensor. This type of aperture makes it possible to render the point spread function of the imaging system dependent on the distance of the object with respect to the system.

In particular, the article of A. Levin et al., *Image and Depth from a Conventional Camera with a Coded aperture*, proposes the use of a specific geometry of coded aperture, in order to deconvolute the blurry zones of an image while still estimating the distance of the corresponding objects to these zones with respect to the imaging system.

This method requires deconvoluting the image with all of the point spread functions corresponding to different distances between the object and the imaging system then convoluting them again in order to compare them with the original image. It therefore requires a substantial amount of calculation time.

PRESENTATION OF THE INVENTION

The invention has for purpose to propose a method for determining the distance of an object with respect to a precise imaging system and which requires a calculation time that is reduced with respect to prior art.

In this respect, the invention has for object a method for determining a distance between an object and an imaging system comprising an image sensor, a unit for processing images, and a geometric aperture positioned upstream of the sensor with respect to the path of the light, with the method characterised in that it comprises the steps consisting in:
  estimating the modulation transfer function of the imaging system at the distance of the object with respect to said system,
  determining the aberration frequencies of the estimated modulation transfer function, and generating an aberration frequency vector,
  implementing a principal component analysis of the vector, in order to determine the principal component of the vector, and
  using the principal component obtained, determining a distance of the object with respect to the system according to a joint distribution of the probability densities between the principal components of aberration frequency vectors of imaging systems and object-system distances, said distribution being obtained by interpolation between:
    principal components of aberration frequency vectors of the modulation transfer function of an imaging system comprising a geometric aperture for a plurality of distances of the object with respect to said system, and
    each distance between the object and the system.

Advantageously, but optionally, the method according to the invention further comprises at least one of the following characteristics:
  the method further comprises a preliminary step of elaborating the joint distribution of the probability densities, comprising the steps of:
    for a plurality of pairs comprising an imaging system comprising a geometric aperture and a distance of an object with respect to said system, estimating the modulation transfer function of the imaging system at the distance of the object,
    for each modulation transfer function estimated for each of the pairs, determining the aberration frequencies of the system at the distance of the object and generating an aberration frequency vector,
    implementing an principal component analysis of each aberration frequency vector, in order to determine the principal component of each vector, and
    elaborating the joint distribution by interpolation between the obtained principal components and each distance between object and imaging system.
  the preliminary step of elaborating the joint distribution of the probability densities comprises, for at least one imaging system, estimating a modulation transfer function of the system at a plurality of distances between the object and the system.
  the preliminary step of elaborating the joint distribution of probability densities comprises estimating modulation transfer functions and generating of aberration frequency vectors for a plurality of imaging systems comprising different geometric apertures.
  the preliminary step of elaborating the joint distribution of probability densities comprises estimating modulation transfer functions for imaging systems comprising a centred circular aperture or a coded aperture of the type chosen from the following group, and/or combinations of these:
    a square aperture,
    an aperture comprising an annular mask,
    an aperture comprising a square mask,
    an aperture comprising an aperture comprising a periodic mask.

the joint distribution of probability density is a Gaussian distribution.

each step of determining the aberration frequencies of a modulation transfer function comprises the determining of the contrast inversion frequencies of the imaging system.

each step of determining the aberration frequencies of a modulation transfer function comprises determining the minima of the function.

The invention also has for object a method for processing an image of an object acquired by an imaging system comprising an image sensor, a unit for processing images and a geometric aperture, with the method comprising:

estimating a distance of the object with respect to the imaging system by implementing the method according to the preceding description, using the distance of the object, selecting a point spread function of the imaging system, and deconvoluting an image acquired of the object by the spread function of the imaging system obtained.

The invention also relates to an imaging system comprising an image sensor, a unit for processing images and a geometric aperture, characterised in that the processing unit is adapted for implementing the method of processing described hereinabove.

The invention finally has for object a computer programme product comprising code instructions for implementing the method of processing described hereinabove when it is implemented by the means of processing of a processing unit.

The proposed invention implements the technique of Principal Component Analysis of the vectors corresponding to the aberration frequencies of the modulation transfer function of an imaging system provided with a geometric aperture.

Surprisingly, regardless of the geometry of the aperture used, the principal component analysis makes it possible to elaborate a joint distribution of probability densities between the principal component of the aberration vector and the distance between the object and the imaging system.

This results, on the one hand, in the possibility to use such a distribution, using a set of imaging systems provided with different geometric apertures. On the other hand, this distribution can be used to determine the distance of an object with respect to an imaging system, regardless of the aperture associated with this system.

The determining of the distance of the object with respect to the system is implemented more quickly and with less expense in calculation resources than in prior art, since in particular it is sufficient to load a pre-established distribution of probability densities, and that it is not necessary to test several point spread functions in order to find the optimum function.

DESCRIPTION OF THE DRAWINGS

Other characteristics, purposes and advantages of this invention shall appear when reading the following detailed, with regards to the annexed figures, provided by way of non-restricted examples and wherein.

DETAILED DESCRIPTION OF AT LEAST ONE EMBODIMENT OF THE INVENTION

Figure 1:
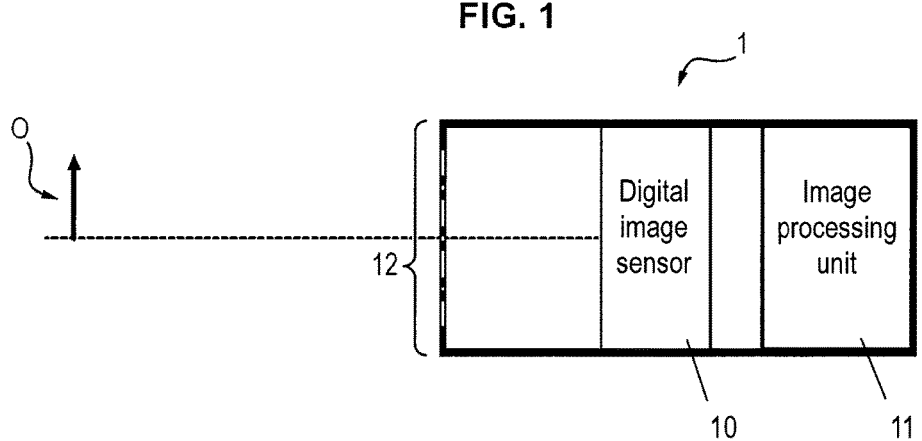
FIG. 1 diagrammatically shows an imaging system comprising a geometric aperture.

In reference to FIG. 1, an imaging system 1 is diagrammatically shown. The imaging system can be a digital still camera or a digital video camera. It comprises a digital image sensor 10, and a unit 11 for processing images, adapted to process the signals generated by the sensor 10 in order to reconstruct an image, from these signals, of an object O.

Upstream of the sensor 10 with respect to the path of the light, the system further comprises an aperture 12, or diaphragm. This aperture allows only a portion of the incident light to pass to the sensor.

This can be a conventional centred circular aperture or a coded aperture, i.e. any aperture other than a centred and circular hole, and in particular, but not in a limited manner, any diaphragm aperture consisting of several holes. It can in this respect include a peripheral edge $12_b$ that determines a contour of the aperture, and/or an opaque mask $12_m$, arranged in the aperture, and closing off certain zones of the latter. In any case, the aperture defines transparent zones $12_t$ and opaque zones $12_o$ with respect to the light rays (see FIG. 3b).

The aperture can be one of the types described hereinafter in reference to FIG. 3 or a combination of the latter.

The processing unit 11 is adapted to implement the method described hereinafter in reference to FIG. 5, where applicable by a programme of which the execution allows this method to be implemented.

The relation between an object and its image formed by the imaging system, is written in the spectral domain as follows:

$$\hat{I}_i(f_x,f_y)=\hat{I}_g(f_x,f_y)\cdot H(f_x,f_y)$$

Where $\hat{I}_i(f_x,f_y)$ is the image of the object at spatial frequencies $(f_x,f_y)$ by the imaging system, $\hat{I}_g(f_x,f_y)$ is the geometric image of the object by the imaging system, and $H(f_x,f_y)$ is the transfer function of the imaging system.

By definition, the modulation transfer function (MTF) is the modulus of the transfer function H:

$$MTF(f_x,f_y)=|H(fx,fy)|$$

This function characterises the spectral properties of an optical system. Its maximum value is normalised at 100% for an ideal optical system, devoid of any aberration. The value of the modulation transfer function, referred to as MTF in what follows, is less than 100% if the optical system degrades the quality of the image of an object.

The MTF of an imaging system can be evaluated for example by positioning a pattern, comprising an alternation of white and black lines at a variable spatial frequency, in front of the system, and by evaluating the image formed by the system of the pattern.

Figure 2:
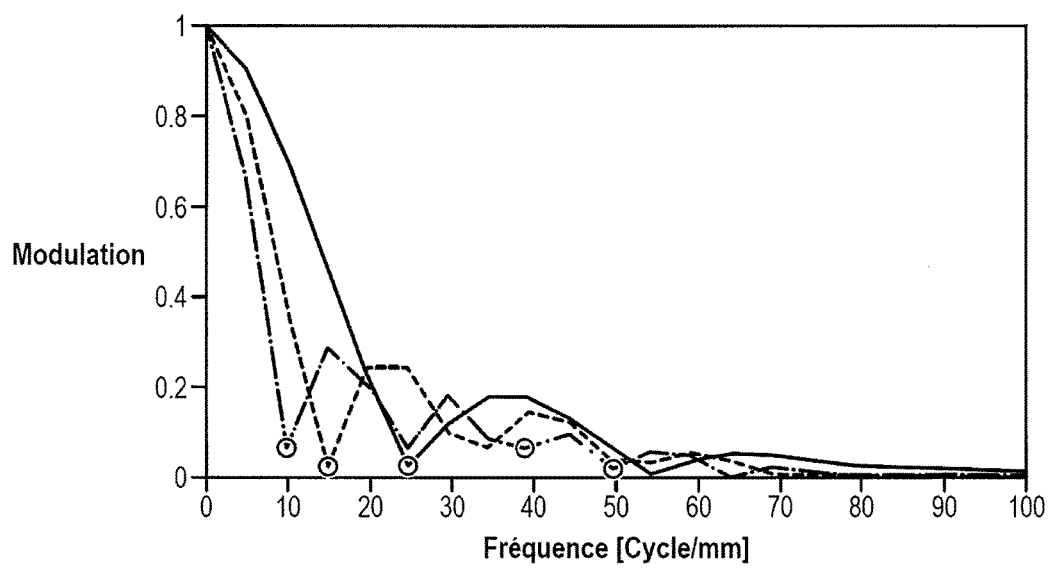
FIG. 2 shows an example of a modulation transfer function of an imaging system at different distances of an object with respect to the system.

FIG. 2 shows an example of MTF of an imaging system at a plurality of different distances of the object with respect to the system. The axis of the abscissa represents the spatial frequency, in cycles/millimeter, of the pattern tested. The axis of the ordinates represents the value of the normalised MTF (with the MTF being one for a zero spatial frequency).

Solid lines show the MTF of an imaging system without aberration, and dotted lines, with different figures, show the MTF of an imaging system presenting aberrations, for different distances of the object with respect to the system.

It is observed firstly that the MTF varies according to the distance of the object with respect to the imaging system.

Furthermore, the MTF makes it possible to identify optical aberrations of the system, in particular the contrast inversion points which are the points that correspond to the minima of the MTF.

The aberration points are circled in the figure.

The positions of the aberration points of the MTF vary according to the distance of the object with respect to the imaging system and according to the aperture 12 positioned upstream of the sensor 10.

Estimating the Distance of an Object with Respect to the Imaging System

The method described hereinafter makes use of this property in order to determine the distance of an object with respect to an imaging system.

Figure 5A:
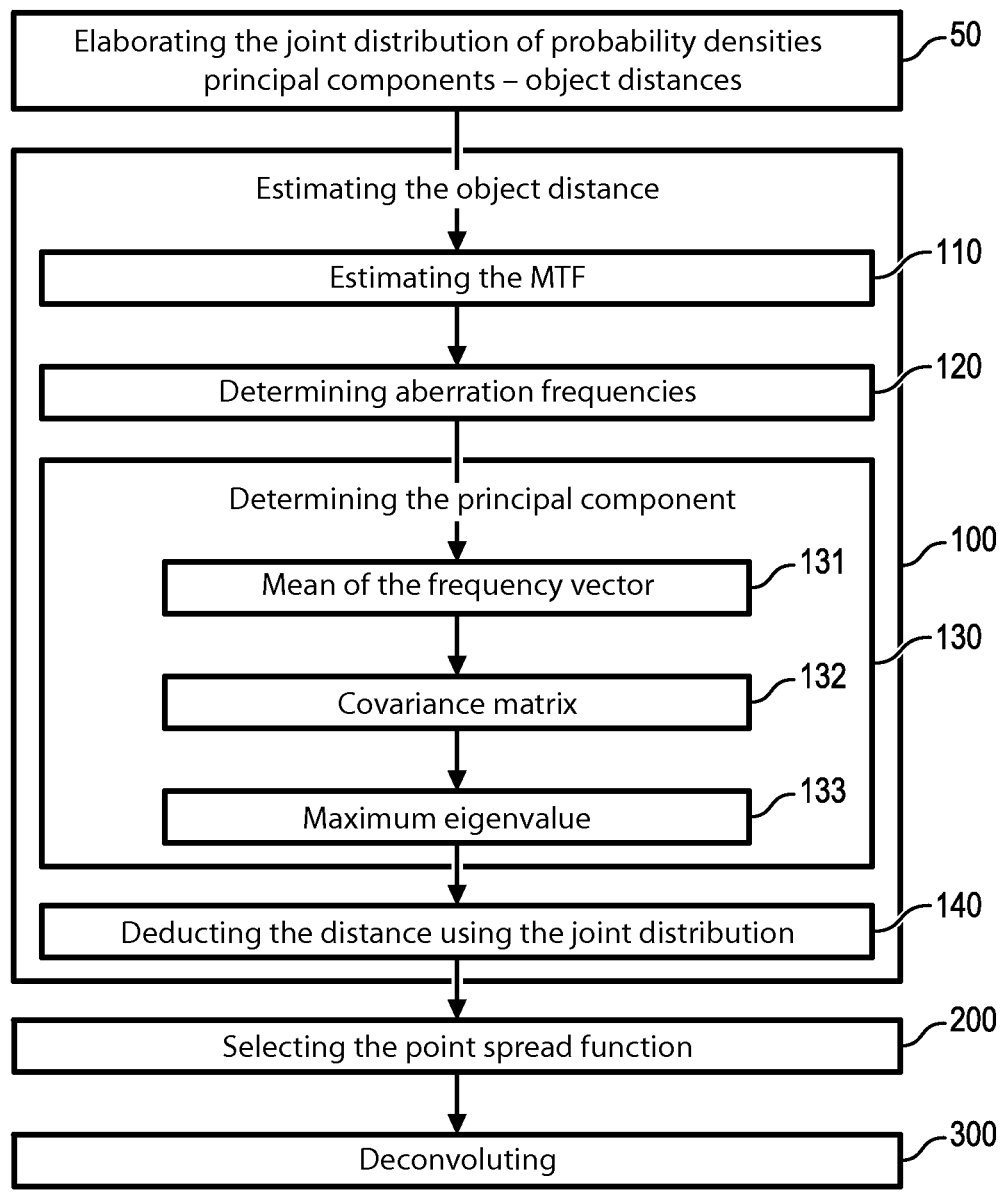
FIGS. 5a and 5b diagrammatically show the different steps of the method for determining the distance of an object with respect to an imaging system according to an embodiment of the invention.

In reference to FIG. 5a, the method 100 of determining the distance with respect to the imaging system 1, implemented by the processing unit 11 of the imaging system, or where applicable by a separate processing unit, comprises a first step 110 of estimating the MTF, or modulation transfer function, of the imaging system 1, at the distance where the object O is located.

This step 110 comprises firstly the estimation of the point spread function of the system using an image of the object O acquired by the system. This estimation is advantageously carried out by using the method proposed in the article of N. Joshi et al., <<PSF estimation using sharp edge prediction>>, IEEE Computer Society, Conference on Computer Vision and Pattern Recognition (CVPR 2008).

The modulation transfer function is then calculated by calculating the Fourier transform of the estimated point spread function.

A curve similar to the curve shown in FIG. 2 is thus obtained.

The method then comprises a step 120 of determining aberration frequencies $f_i$ of the MTF. These aberration frequencies are advantageously spatial frequencies corresponding to contrast inversions of the imaging system. These aberrations are identified on the MTF as being the minima of the MTF.

Minima are meant as the points for which the derivative of the MTF is zero, and the second derivative is positive.

Preferably, all of the aberration frequencies of the MTF are read, but the method also functions if certain aberration frequencies are omitted.

A vector $X=(f_1, \ldots, f_n)$ is constructed from the aberration frequencies, noting n as the number of aberration frequencies, with n being greater than or equal to 1.

The method then comprises a principal components analysis 130 of the vector X, in order to determine the principal component of the vector X. To do this, a first sub-step 131 comprises the calculation, by the processing unit, of the mean $\overline{X}$ of X.

During a second sub-step 132, the processing unit calculates the covariance matrix s of the vector X: $s=(X-\overline{X})(X-\overline{X})^T$.

Finally, during a third sub-step 133, the processing unit determines the highest eigenvalue λ of the covariance matrix s. This is the principal component of X.

Once the principal component of X is determined, the processing unit makes use, during a step 140, of a joint distribution of the probability densities, between the principal components of the aberration frequency vectors of a set of imaging systems, and objet-system distances (the distance between an object and one of the systems of the set), in order to determine the distance of the object with respect to the imaging system 1.

The distance is chosen, using the distribution, as the distance that maximises this distribution for the principal component obtained.

This distribution is advantageously memorised by the processing unit 11, but is more preferably obtained according to the method described hereinafter, in reference to FIG. 5b.

Elaboration of the Joint Distribution

The elaboration of this distribution is advantageously a preliminary step 50 to the method described hereinabove in reference to FIG. 5a, which can be implemented by a processing unit, possibly separated of the imaging system (for example a processor of a computer). The distribution obtained as such can be then loaded into the processing unit 11 of the imaging system.

This distribution is established by carrying out a principal component analysis, in accordance with the steps 110 to 130 described hereinabove, of transfer modulation functions of a plurality of couples (imaging system, object-system distance), that is to say that each pair comprises an imaging system and a distance of the object with respect to the system. The analysis is therefore implemented for at least one system with a plurality of distances of an object with respect to the system, or for several systems, with at least one distance of the object with respect to each system.

Preferably, the method comprises the principal component analysis of the aberration frequencies of the modulation transfer functions of several imaging systems, each system comprising an aperture of different geometry and dimension. The use of these multiple geometries of apertures varies the depth of the field of the imaging system and therefore its MTF.

In addition, for each imaging system, the principal component analysis is carried out more preferably for a plurality of distances of an object with respect to the system.

By way of example, FIG. 3 shows different geometries of aperture, each geometry of aperture comprising apertures of different dimensions.

Figure 3A:
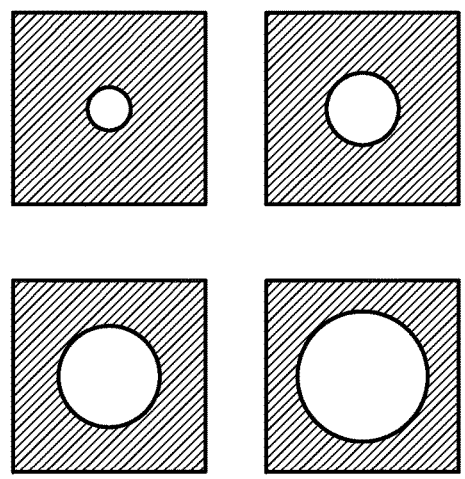
FIGS. 3a to 3g show different geometric apertures used for the elaborating of a joint distribution of probability density between the principal components of aberration frequency vectors of the modulation transfer function of a system and the distance of an object with respect to the system.
Figure 3B:
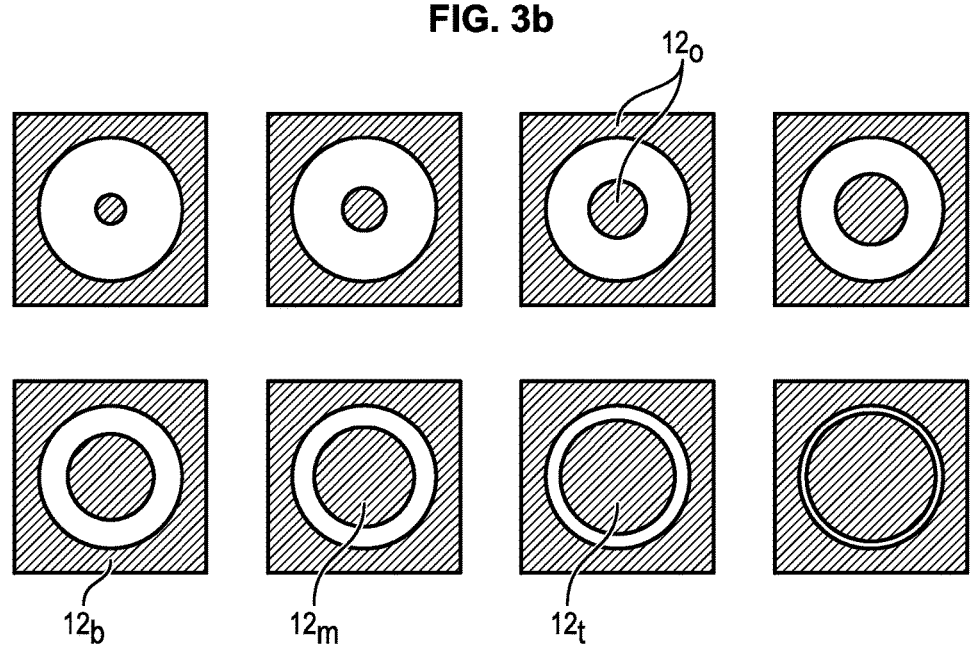

In FIG. 3a, the aperture can be circular and centred.

Alternatively, in FIGS. 3b to 3g, the aperture can be a coded aperture, i.e. other than a centred circular aperture. For example, it can be circular and include an annular mask (see FIG. 3b).

Figure 3C:
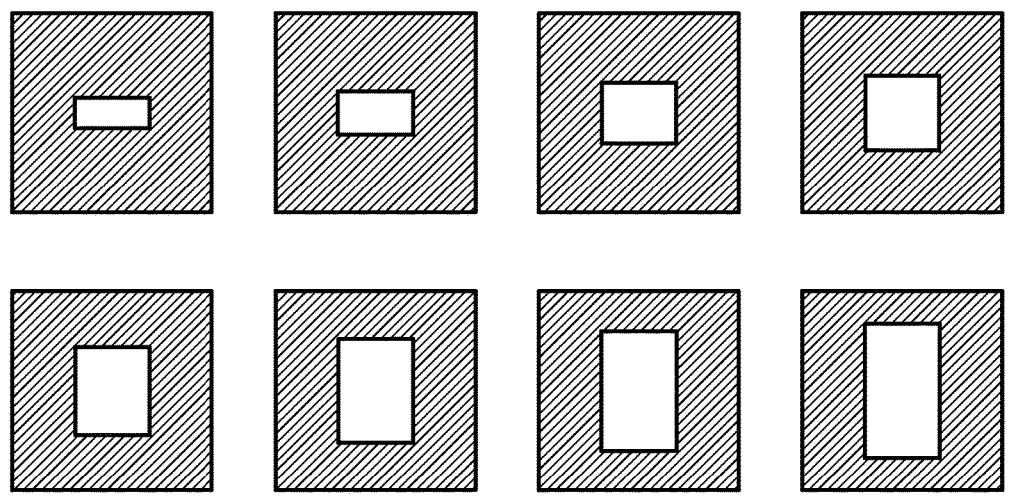
Figure 3D:
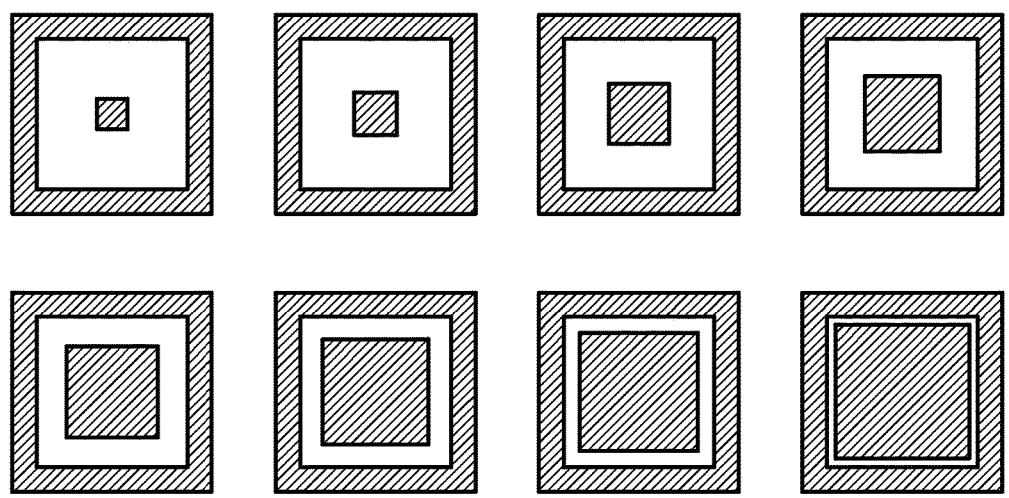
Figure 3E:
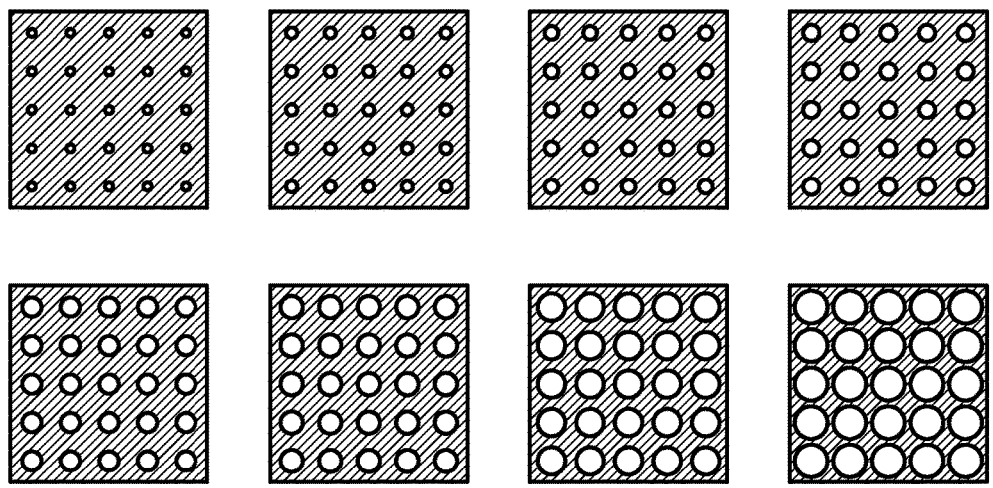
Figure 3F:
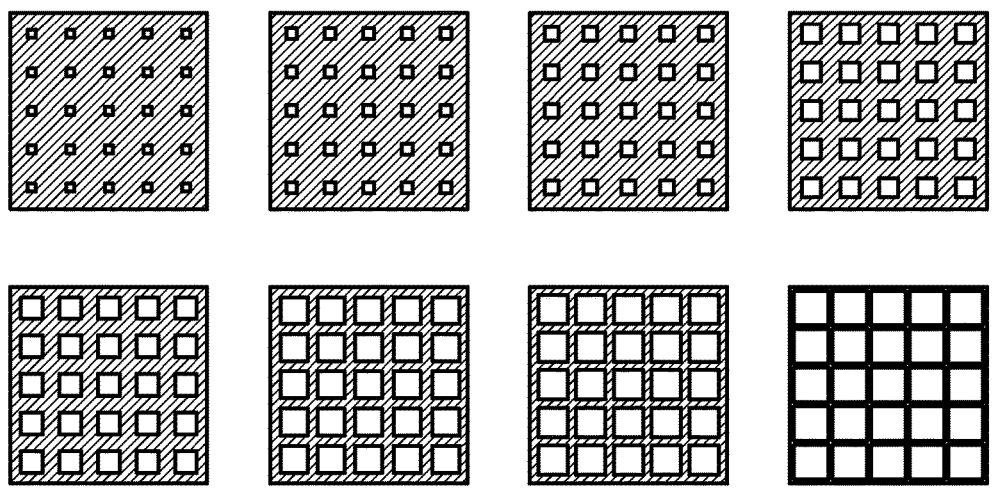

In FIG. 3c, the aperture can be square or rectangular, and possibly include a square or rectangular mask (FIG. 3d).

Alternatively, the aperture can be of the type comprising a circular (FIG. 3e) or square (FIG. 3f) periodic mask.

Figure 3G:
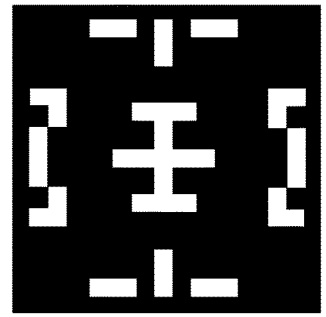

Another example of a coded aperture is shown in FIG. 3g, with a mask that has another arrangement of opaque zones and transparent zones.

Other geometries of apertures can also be adopted, such as a combination between several geometries presented hereinabove.

Figure 5B:
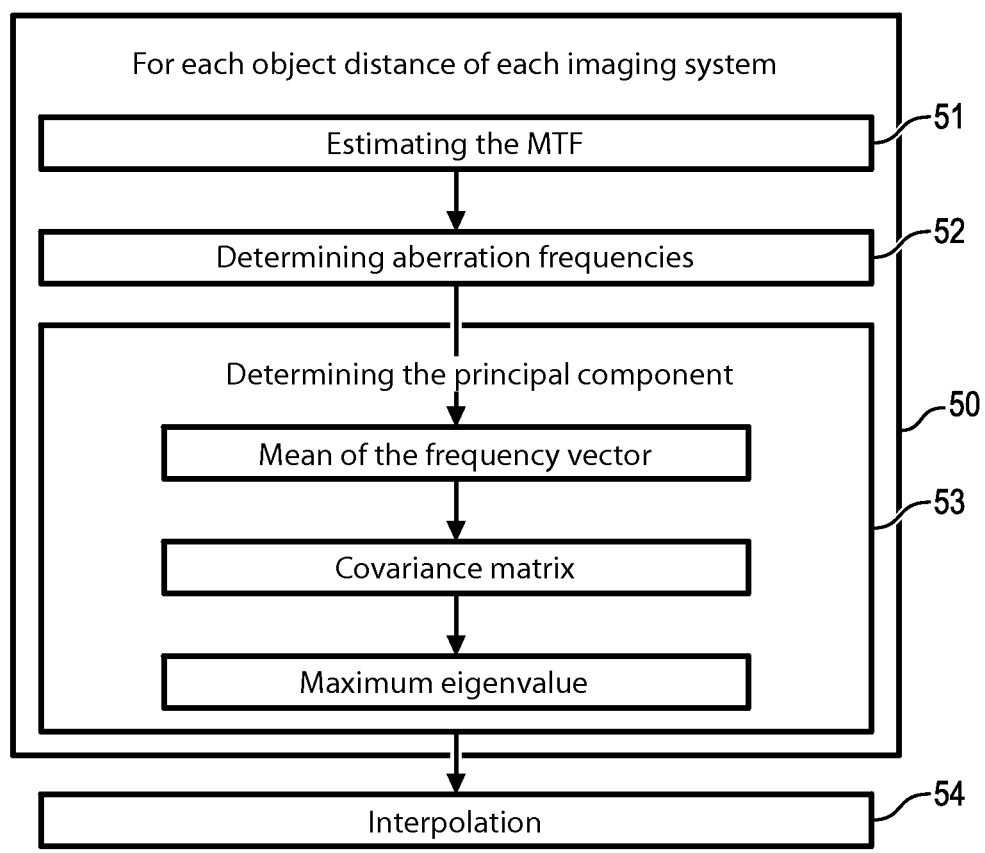

Back to FIG. 5b, for each imaging system, a first step 51 comprises the estimation of the MTF of the imaging system, at at least one, and more preferably at a plurality of distances of an object with respect to the system.

A step 52 then comprises the determining of the aberration frequencies f*$_i$ of each MTF, and the constructing of an associated vector X*=(f*$_1$, . . . , f*$_m$)–m being the number of aberration frequencies, greater than or equal to 1, of each MTF.

At the end of the step 52, the number of vectors created therefore corresponds to the number of imaging systems tested multiplied by the number of distances tested between the object and each system.

A step 53 then comprises the principal component analysis of each vector X*. This step comprises the same calculations as the step 300 described hereinbefore, namely:

The calculation for each vector X*, of a mean $\overline{X}$*,

The calculating, for each vector X*, of a covariance matrix s*=(X*−$\overline{X}$*)(X*−$\overline{X}$*)$^T$, and The determining of the highest eigenvalue λ* of each covariance matrix, with this eigenvalue forming the principal component.

At the end of the step 53, for each imaging system, and each object distance, the corresponding principal component of the system is therefore obtained.

Finally, the joint distribution of probability densities between the principal components λ* and the distances between the objects and the imaging systems is carried out during a step 54 via interpolation (curve fitting) between the principal components and the distances.

Figure 4:
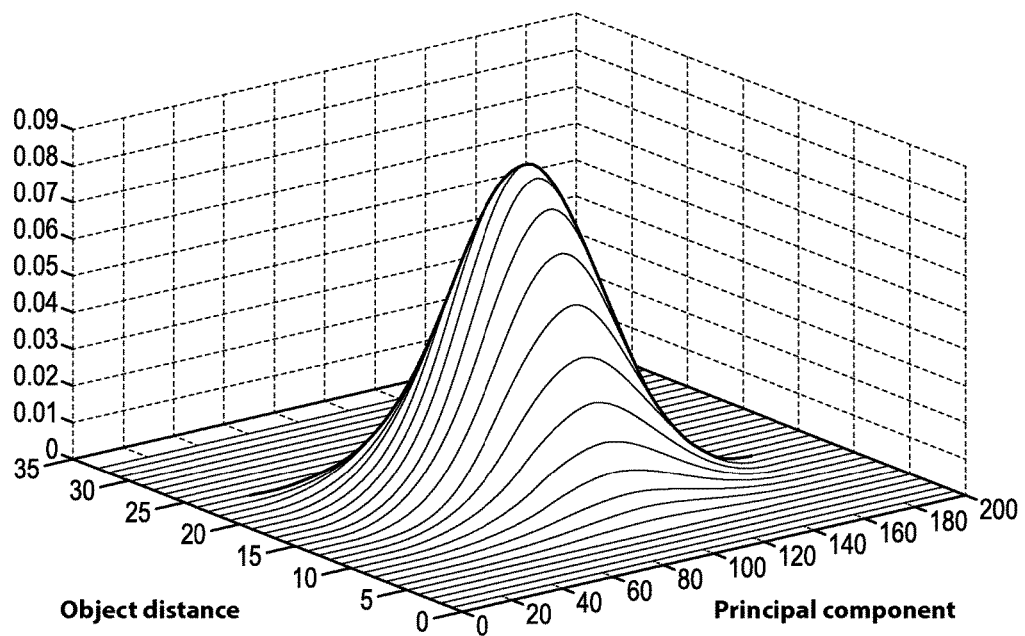
FIG. 4 shows the distribution of the probability density obtained.

With reference to FIG. 4, the distribution obtained is a Gaussian distribution. This distribution, due to the fact that it is obtained by principal component analysis, using a variety of geometric apertures, is common to any type of imaging system, regardless of its geometric aperture.

This distribution therefore makes it possible to then determine, returning to the imaging system 1 and to FIG. 5a, the distance of the object with respect to the system using principal component λ for this system and at this distance of the object, regardless of the system.

The precise determination of the distance of the object with respect to the imaging system then makes it possible, returning to FIG. 5a, to process the image acquired by the imaging system in order to render it as sharp as possible.

Indeed, the processing unit 11 of the imaging system can firstly determine with the method 100 the distance of the object with respect to the system, then, using this distance, select 200 an optimum point spread function for this distance.

To do this, the processing unit 11 can select, from among a plurality of spread functions associated with different distances of the object with respect to the system, the one that corresponds to the distance obtained.

Once the point spread function is selected, the processing unit 11 can deconvolute 300 the image obtained with this function in order to restore the image of the object.

A possible implementation of these steps is described for example in the article of V. Dimri: <<*Deconvolution and Inverse Theory*>>, Eslevier (October 1992).

A method has thus been proposed that makes it possible to improve the sharpness of the images acquired by a digital imaging system. In addition, this method is of fast implementation, as the joint distribution of the probability densities of the principal components and of the object distances must be established only in a preliminary manner to the effective use of an imaging system. It is then sufficient to load it into the system and to make use of it in order to determine the distance of the object with respect to the system.

Finally, the method can be applied regardless of the aperture or of the inlet diaphragm of the system.

The invention claimed is:

1. A method (100) for processing an image of an object (O) acquired by an imaging system (1), wherein the method comprises the following steps:
   determining a distance between the object (O) and the imaging system (1), wherein said distance determination comprises the following sub-steps:
   estimating (110) a modulation transfer function of the imaging system on the basis of an acquired image of the object (O),
   determining (120) aberration frequencies of the estimated modulation transfer function, and generating an aberration frequency vector,
   implementing (130) a principal component analysis of the aberration frequency vector, in order to determine a principal component of the vector, and
   using the principal component obtained, determining (140) the distance between the object and the imaging system by comparing said principal component to a joint distribution of probability densities of principal components of aberration frequency vectors,
     said distribution being obtained by interpolation between previously obtained principal components of aberration frequency vectors of modulation transfer functions for a plurality of other imaging systems, each corresponding to an other object, and
     the distances between each of said other imaging systems and the corresponding other objects
   using the determined distance of the object, selecting (200) a point spread function of the imaging system, and
   deconvoluting (300) the acquired image of the object by using the selected spread function of the imaging system, in order to improve sharpness of the acquired image.

2. The method (100) according to claim 1, further comprising a preliminary step (50) of elaborating the joint distribution of probability densities of previously determined principal components of aberration frequency vectors, comprising the steps of:
   for the plurality of pairs comprising
     an imaging system comprising a geometric aperture and
     a distance of an object with respect to said system,
   estimating (51) the modulation transfer function of the imaging system,
   for each modulation transfer function estimated for each of the pairs, determining (52) the aberration frequencies of the system and generating an aberration frequency vector,
   implementing (53) a principal component analysis of each aberration frequency vector, in order to determine the principal component of each vector, and
   elaborating (54) the joint distribution via interpolation between the obtained principal components and each distance between objects and each of the imaging systems.

3. Method (100) according to claim 2, wherein the preliminary step (50) of elaborating the joint distribution of probability densities comprises, for at least one imaging system, estimating (51) a modulation transfer function of the system at a plurality of distances between the object and the system.

4. Method (100) according to claim 2, wherein the preliminary step (50) of elaborating the joint distribution of probability densities comprises estimating (51) modulation transfer functions and the generating (52) of aberration frequency vectors for a plurality of imaging systems comprising different geometric apertures.

5. Method (100) according to claim 4, wherein the preliminary step (50) of elaborating the joint distribution of probability densities comprises estimating (51) modulation transfer functions for imaging systems comprising a centred circular aperture or a coded aperture of the type chosen from among the following group, and/or combinations of these:
- a square aperture,
- an aperture comprising an annular mask,
- an aperture comprising a square mask,
- an aperture comprising a periodic mask.

6. Method (100) according to claim 1, wherein the joint distribution of probability density is a Gaussian distribution.

7. Method (100) according to preceding claim 1, wherein each step of determining (120, 52) aberration frequencies of a modulation transfer function comprises determining contrast inversion frequencies of the imaging system.

8. Method (100) according to claim 7, wherein each step of determining (120, 52) aberration frequencies of a modulation transfer function comprises determining the minima of the function.

9. Imaging system (1) comprising an image sensor (10), a unit for processing images (11) and a geometric aperture (12), wherein the processing unit is adapted for implementing the method according to claim 1.

10. A non-transitory computer-readable medium containing code instructions for implementing the method of claim 1, wherein said code instructions are executed by processing means of a processing unit.

* * * * *